March 19, 1940.    E. E. WYATT    2,194,042
FRONT BUMPER WITH LICENSE PLATE
Filed Oct. 17, 1938
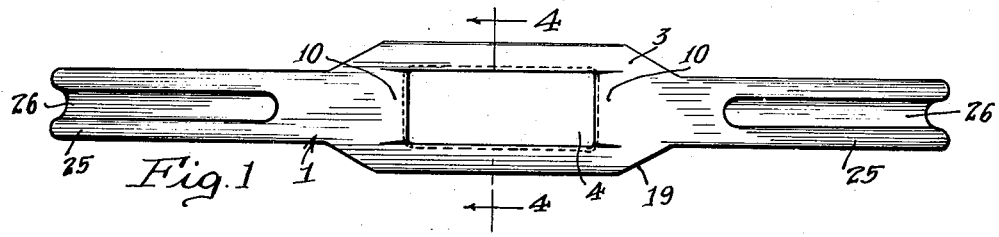
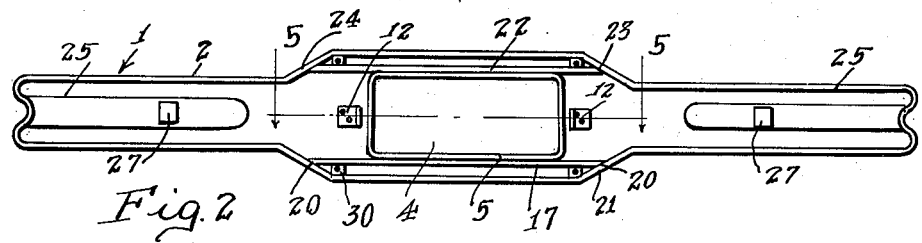
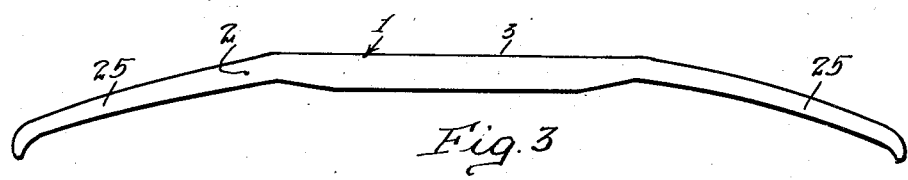
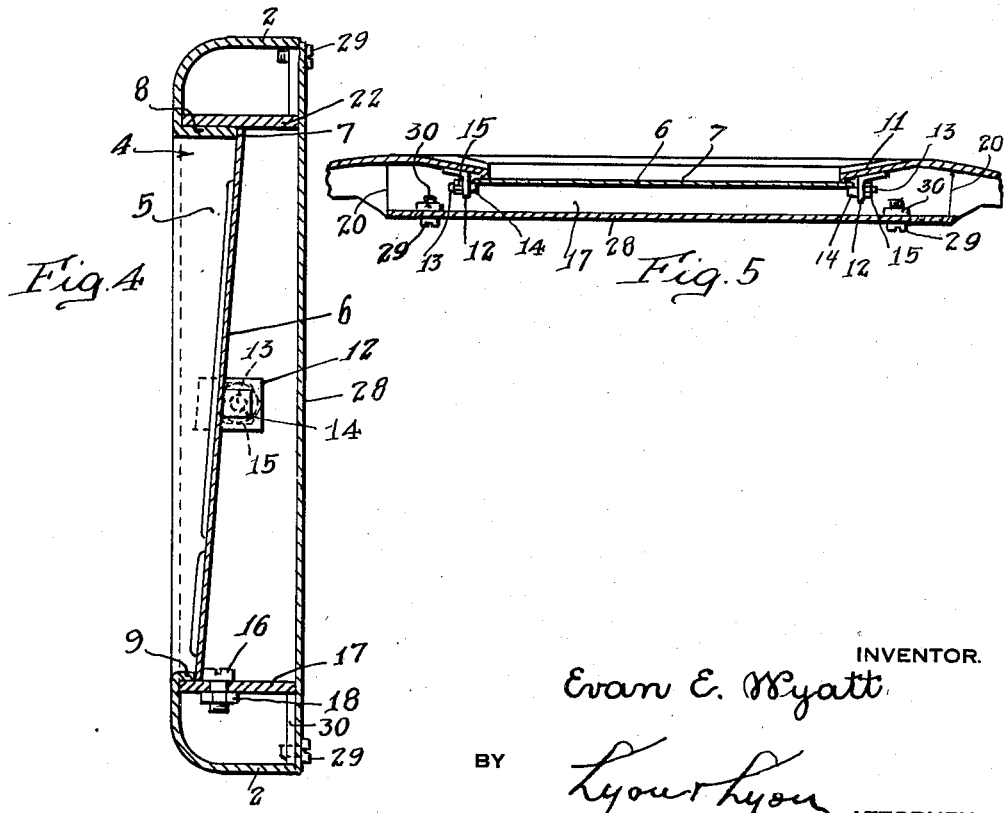
INVENTOR.
Evan E. Wyatt,
BY
Lyon & Lyon
ATTORNEYS Patented Mar. 19, 1940

2,194,042

UNITED STATES PATENT OFFICE 2,194,042

FRONT BUMPER WITH LICENSE PLATE

Evan E. Wyatt, Los Angeles, Calif.

Application October 17, 1938, Serial No. 235,350

5 Claims. (Cl. 40—125)

This invention relates to automobile bumpers, and the invention is particularly applicable in the construction of a front bumper.

My prior Patent No. 2,167,791 entitled "Combined bumper and licence plate", granted August 1, 1939, discloses a bumper construction in which the license plate is carried within the bumper in such a way that a light carried in the bumper, throws its rays upon the front of the license plate. That construction is particularly useful for rear bumpers because rear license plates must be illuminated. There is no such requirement as regards forward license plates, and hence a front bumper constructed to carry a license plate need not be provided with a lamp for illuminating it.

One of the objects of the present invention is to provide a bumper construction in which the license plate is carried within the body of the bumper in such a way that it will be protected from injury, but at the same time, it will be readily visible from the front and from the sides of the roadway.

A further object of the invention is to provide improved means cooperating with the bumper for securing the license plate on a seat.

A further object of the invention is to provide a construction for the bumper, which will adapt the bumper to be readily formed as a stamping by means of dies, and in such a way that an integral flange formed on the bumper forms a seat for the license plate; also to provide such a bumper with improved means for stiffening it at its middle portion where the license plate is carried.

Further objects of the invention will appear hereinafter.

The invention consists in the novel parts and combination of parts to be described hereinafter, all of which contribute to produce an efficient front bumper with license plate.

A preferred embodiment of the invention is described in the following specification, while the broad scope of the invention is pointed out in the appended claims.

In the drawing:

Fig. 1 is a front elevation of a front bumper embodying my invention and showing the same without the license plate.

Fig. 2 is a rear elevation of the bumper illustrated in Fig. 1.

Fig. 3 is a plan of the bumper illustrated in Figs. 1 and 2.

Fig. 4 is a vertical section upon an enlarged scale taken about on the line 4—4 of Fig. 1, particularly illustrating the construction at the license plate window, together with the means for holding the license plate against its seat.

Fig. 5 is a horizontal section taken about on the line 5—5 of Fig. 2, further illustrating means for holding the license plate in position, and features of construction of the bumper which enable it to be readily visible at the sides of the roadway.

In practicing the invention, I prefer to construct the bumper 1 of a stamping formed by dies from a sheet metal plate, and these dies form the bumper with a marginal flange 2 that preferably extends all around the edge of the bumper to give it stiffness and strength. The middle portion of the bumper is preferably enlarged in a vertical direction to form a face plate 3 at which the window 4 for the license plate is formed. This window is formed by punching an opening in the face plate by means of the dies, and bending the edge of the opening back to form a flange 5 on this opening. While this flange, if desired, can be made discontinuous, it is preferably continuous so as to increase the rigidity of the face plate, and so as to form a continuous seat for the license plate 6. For this purpose this window flange 5 is preferably disposed in a plane at right angles to the plane of the face plate, and the inner edge 7 of the flange forms a seat for the license plate.

Although, if desired, this flange 5 may be of uniform width so as to hold the license plate 6 in a vertical plane, I prefer to have the flange tapering in width from its upper horizontal extension 8 to its lower horizontal extension 9. This gives the flange considerable depth at its upper portion, which gives considerable stiffness to the face plate, and also gives considerable depth to the flange at about mid height of the license plate window 4; and this is accomplished without seriously interfering with the visibility of the outer face of the plate carrying the license number.

In order to further increase the visibility of the upper portion of the plate, which is set back a considerable distance into the license plate window, I prefer to form the face plate at each end of the opening 4 with depressions 10 at which the face plate is formed with inclined cheeks 11 (see Fig. 5) which virtually reduce the width of the shoulders formed at the ends of the license plate. This enables the numbers on the license plate to be read easily by persons standing toward the sides of the roadway.

It is also desirable to have the license plate set back into the body of the bumper in this way, because this prevents the license plate from being struck by a bumper of another car if its bumper should strike this bumper carrying the license plate.

In order to secure the license plate on its seat 7, I prefer to provide a lug 12 at each end of the window 4. These lugs may be formed in any suitable manner and, if desired, may be welded onto the rear faces of the inclined cheeks 11. Each lug is provided with means such as a bolt 13 for holding the license plate against its seat 7. For this purpose each bolt 13 may be provided with a square head 14, the side face of which seats against the rear side of the license plate. The bolt extends through the lug and carries a nut 15 that is tightened up against the face of the lug.

If additional security is desired for the license plate, this may be attained by means of a bolt or machine screw 16 that passes down through an opening in a horizontal rib 17 (see Fig. 4), which is embodied in the construction of the bumper as will be described more fully hereinafter. This bolt or screw 16 is provided with a nut 18 on the under side of the rib or bar 17, which can be tightened up to secure this screw in place.

This bar 17 is preferably of strap metal, and it extends along the under side of the lower horizontal extension 9 of the flange 5 to which is may be welded, if desired.

The ends of the body portion 3 of the face plate are preferably inclined as indicated at the edges 19 in Figs. 1 and 2, and the ends of the bar or rib 17, may be welded at the junction points 20 where this bar lies against the inclined extensions 21 lying along the edges 19.

At the upper side of the opening 4 a similar rib or bar 22 is provided (see Fig. 4), which rests against the upper face of the horizontal extension 8 of the flange 5, and which may be welded to the same if desired. The ends of this rib 22 are welded at its junctions 23 to the upper inclined end flanges 24 that correspond to the flange extensions 21. These bars 17 and 22 give considerable rigidity to the flanges 8, and also greatly stiffen the body 3 of the bumper without detracting in any way from its smooth and ornamental appearance on its outer side. Beyond the inclined ends of the body 3 of the bumper, the bumper is formed with end portions or arms 25, which may be of uniform width and which may be pressed with a central channel 26 or otherwise, to give them a cross-section that will increase their stiffness.

On these arms at a suitable point, lugs 27 are provided on the inner side of the bumper, to enable the bumpers to be attached to the automobile frame.

If desired, a rear cover plate 28 may be provided to cover the rear side of the body portion of the bumper, and particularly the rear side of the window 4. This plate may be secured in place by machine screws 29 threaded into short bars 30 welded into place in a vertical position between the bars 17 and 22 and the upper and lower extensions of the marginal flange 2 that extends all around the bumper.

It will be evident that the flange 5 considerably stiffens the body portion of the bumper, and this stiffening effect is enhanced by the use of the horizontal ribs 17 and 22 that extend along the horizontal extensions 8 and 9 of the flange 5. Hence this bumper can be made out of relatively light sheet metal. In this way I am enabled to construct a "license-plate-carrying" front bumper without substantially increasing the cost of the bumper.

Setting back the license plate into the opening 4 is also very advantageous for the reason that it is a common practice now to attach vertical guards to bumpers to prevent the bumper of one car from becoming interlocked with the bumper of another car. If a license plate were carried on the bumper in an exposed position, such a vertical guard could strike a license plate and do injury to it.

It is understood that the embodiment of the invention described herein is only one of the many embodiments this invention may take, and I do not wish to be limited in the practice of the invention, nor in the claims, to the particular embodiment set forth.

What I claim is:

1. An automobile bumper having a face plate with an opening therethrough to receive a license plate, and having an inwardly projecting flange at the edge of said opening, including tapered flanges at the ends of the opening, thereby forming a seat for the license plate disposed in a plane inclined from vertical, a lug adjacent each end of the opening, and means carried by each lug for securing the license plate against the edge of said flange.

2. An automobile bumper having a face plate with an opening therethrough to receive a license plate, and having an inwardly projecting flange at the edge of said opening, forming a seat for the license plate, said bumper having a lug adjacent each end of the opening, a bolt carried by each lug with the side of a part of the bolt projecting over the edge of the license plate to hold the same against the edge of the flange.

3. An automatic bumper having a face plate with an opening therethrough to receive a license plate, and having an inwardly projecting flange at the edge of said opening, forming a seat for the license plate, said face plate having depressions therein merging into the ends of said opening to increase the visibility of the license plate from the side of the roadway.

4. An automobile bumper having a face plate with an opening therethrough to receive a license plate, and having an inwardly projecting flange at the edge of said opening, forming a seat for the license plate, the edge of said flange lying in a plane inclined to the vertical so that the upper edge of the license plate lies set back considerably behind the plane of the face plate, said face plate having depressions with inclined faces merging into the ends of the opening increasing the visibility of the license plate from the side of the roadway.

5. An automobile bumper having a face plate with an opening therethrough to receive a license plate, and having an inwardly projecting flange at the edge of said opening, forming a seat for the license plate, said face plate having inclined edges adjacent its ends with end flanges extending along the same, and ribs lying against the outer faces of the horizontal extensions of said first-named flange and welded to said end flanges.

EVAN E. WYATT.